United States Patent
Jarvis et al.

(10) Patent No.: US 10,448,214 B1
(45) Date of Patent: Oct. 15, 2019

(54) DETERMINING A PATH OF TRAJECTORY OF A WIRELESS DEVICE

(71) Applicant: QUALCOMM Incorporated, San Diego, CA (US)

(72) Inventors: Murray Jarvis, Cambridge (GB); Paul Dominic Hiscock, Cambridge (GB); Thomas Allan, St Neots (GB); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/143,111

(22) Filed: Sep. 26, 2018

(51) Int. Cl.
*H04W 4/029* (2018.01)
*H04W 24/08* (2009.01)
*H04W 4/02* (2018.01)
*H04W 4/38* (2018.01)
*H04W 84/18* (2009.01)

(52) U.S. Cl.
CPC .......... *H04W 4/029* (2018.02); *H04W 4/027* (2013.01); *H04W 4/38* (2018.02); *H04W 24/08* (2013.01); *H04W 84/18* (2013.01)

(58) Field of Classification Search
CPC ....... H04W 4/029; H04W 4/38; H04W 4/027; H04W 24/08; H04W 84/18
USPC .................... 455/456.1–456.6, 457
See application file for complete search history.

(56) References Cited

U.S. PATENT DOCUMENTS

| | | | | |
|---|---|---|---|---|
| 8,825,388 | B2 * | 9/2014 | Khorashadi | G01C 21/206 701/434 |
| 9,661,473 | B1 * | 5/2017 | Jarvis | H04W 4/043 |
| 9,689,962 | B2 | 6/2017 | Tufvesson et al. | |
| 9,885,774 | B2 * | 2/2018 | Kumar | G01S 5/0215 |
| 10,015,769 | B1 * | 7/2018 | Younis | H04W 64/00 |
| 2008/0077326 | A1 * | 3/2008 | Funk | G01C 21/165 701/500 |
| 2010/0302102 | A1 * | 12/2010 | Desai | G01S 3/50 342/417 |
| 2014/0351886 | A1 * | 11/2014 | Edge | G06F 21/60 726/3 |
| 2015/0133145 | A1 * | 5/2015 | Palanki | H04W 4/025 455/456.1 |
| 2015/0346349 | A1 * | 12/2015 | Taylor, Jr. | G01S 11/08 342/357.24 |
| 2015/0354969 | A1 * | 12/2015 | Chao | G01C 21/206 701/533 |
| 2016/0105761 | A1 * | 4/2016 | Polo | H04W 56/001 455/41.2 |
| 2016/0255463 | A1 * | 9/2016 | Das | H04W 4/02 455/456.1 |
| 2016/0358459 | A1 * | 12/2016 | Singhar | G08C 17/02 |

(Continued)

*Primary Examiner* — Mong-Thuy T Tran
(74) *Attorney, Agent, or Firm* — Arent Fox, LLP and Qualcomm, Incorporated

(57) ABSTRACT

In an aspect of the disclosure, a method, a computer-readable medium, and an apparatus are provided. The apparatus may receive at least one signal from a second wireless device, the at least one signal including one or more of RTP information or inertial sensor information. The apparatus may determine at least one AoA measurement and at least one RTP measurement associated with the at least one signal received from the second wireless device. The apparatus may determine a path of trajectory of the second wireless device based at least in part on the at least one AoA measurement, the at least one RTP measurement, and the inertial sensor information.

20 Claims, 10 Drawing Sheets

(56) References Cited

U.S. PATENT DOCUMENTS

| | | | |
|---|---|---|---|
| 2017/0227623 A1* | 8/2017 | Park | G01S 3/18 |
| 2018/0091952 A1 | 3/2018 | Sant et al. | |
| 2018/0176776 A1 | 6/2018 | Knaappila | |
| 2018/0206075 A1* | 7/2018 | Demirdag | H04W 4/023 |
| 2018/0227959 A1 | 8/2018 | Fraccaroli | |
| 2019/0053013 A1* | 2/2019 | Markhovsky | H04W 4/029 |

* cited by examiner

DETERMINING A PATH OF TRAJECTORY OF A WIRELESS DEVICE

BACKGROUND

Field

The present disclosure relates generally to communication systems, and more particularly, to a determining a path of trajectory of a moving wireless device.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, a Bluetooth® Low Energy (BLE) protocol, a Zigbee® protocol, etc.), provide wireless connectivity to peripheral devices by providing wireless links that allow connectivity within a specific distance (e.g., 5 meters, 10 meters, 20 meters, 100 meters, etc.).

BT is a short-range wireless communication protocol that supports a WPAN between a central device (e.g., a master device) and at least one peripheral device (e.g., a slave device). Power consumption associated with BT communications may render BT impractical in certain applications, such as applications in which an infrequent transfer of data occurs.

To address the power consumption issue associated with BT, BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. A BLE communications link between two devices may be established using, e.g., hardware, firmware, host operating system, host software stacks, and/or host application support. Example applications that use BLE include battery-operated sensors and actuators in various medical, industrial, consumer, and fitness applications. BLE may be used to connect devices such as BLE enabled smart phones, tablets, and laptops. While traditional BLE offers certain advantages, there exists a need for further improvements in BLE technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive at least one signal from a second wireless device, the at least one signal including one or more of round-trip phase (RTP) information or inertial sensor information. Additional details regarding determining a distance to a second device using RTP information can be found in U.S. Pat. No. 10,057,798, the entirety of which is incorporated by reference herein. The apparatus may determine at least one angle-of-arrival (AoA) measurement and at least one RTP measurement associated with the at least one signal received from the second wireless device. The apparatus may determine a path of trajectory of the second wireless device based at least in part on the at least one AoA measurement, the at least one RTP measurement, and the inertial sensor information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
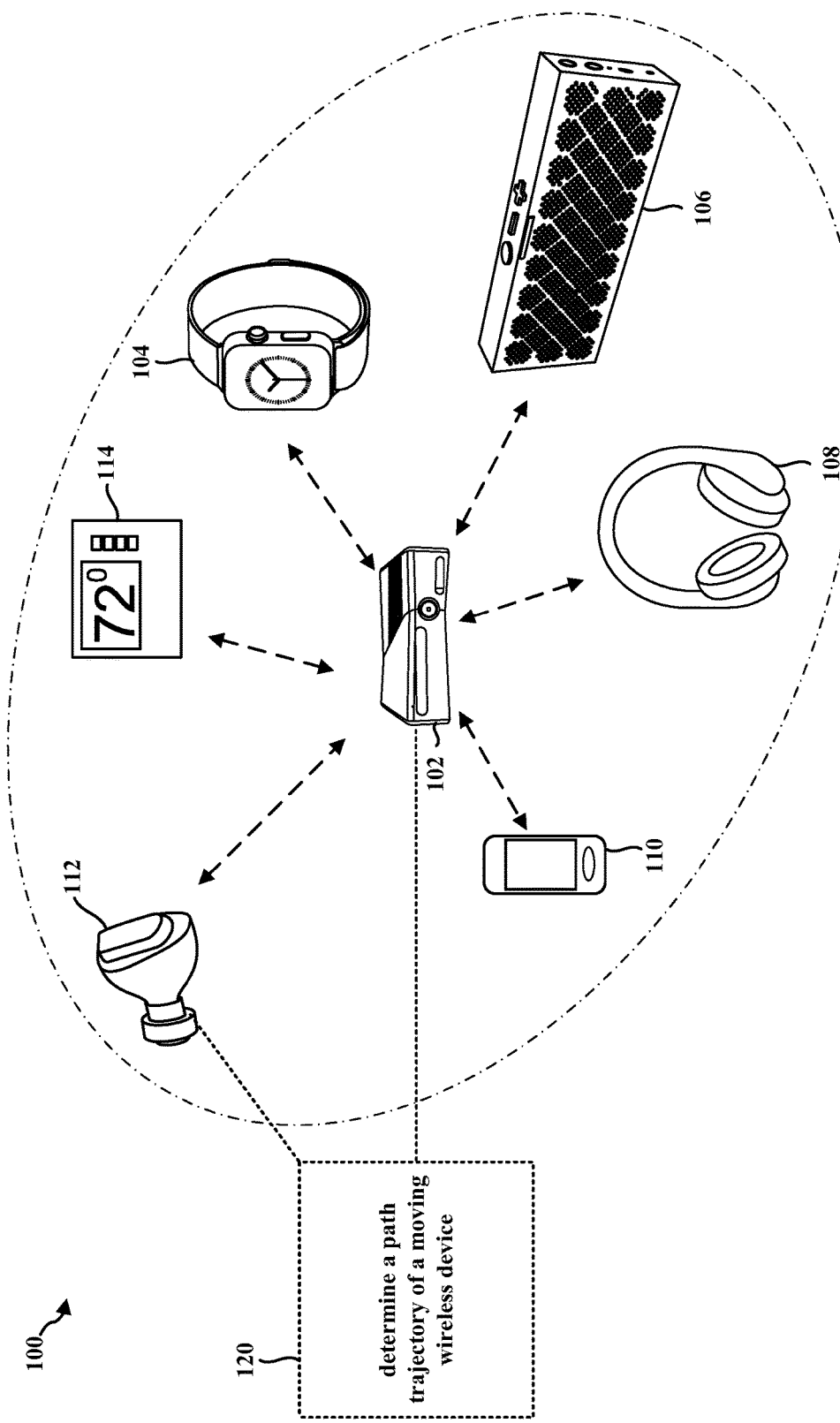
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, 114 using the BLE protocol or the modified BLE protocol as described below in connection with any of FIGS. 2-9. The central device 102 may operate as an initiator to request establishment of a link layer (LL) connection with an intended peripheral device 104, 106, 108, 110, 112, 114.

A LL in the BLE protocol stack and/or modified BLE protocol stack (e.g., see FIG. 3) provides, as compared to BT, ultra-low power idle mode operation, simple device discovery and reliable point-to-multipoint data transfer with advanced power-save and encryption functionalities. After a requested LL connection is established, the central device 102 may become a master device and the intended peripheral device 104, 106, 108, 110, 112, 114 may become a slave device for the established LL connection. As a master device, the central device 102 may be capable of supporting multiple LL connections at a time with various peripheral devices 104, 106, 108, 110, 112, 114 (slave devices). The central device 102 (master device) may be operable to manage various aspects of data packet communication in a LL connection with an associated peripheral device 104, 106, 108, 110, 112, 114 (slave device). For example, the central device 102 may be operable to determine an operation schedule in the LL connection with a peripheral device 104, 106, 108, 110, 112, 114. The central device 102 may be operable to initiate a LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, 114 may take place within connection events.

In certain configurations, the central device 102 may be configured to transmit the first LL data PDU in each connection event to an intended peripheral device 104, 106, 108, 110, 112, 114. In certain other configurations, the central device 102 may utilize a polling scheme to poll the intended peripheral device 104, 106, 108, 110, 112, 114 for a LL data PDU transmission during a connection event. The intended peripheral device 104, 106, 108, 110, 112, 114 may transmit a LL data PDU upon receipt of packet LL data PDU from the central device 102. In certain other configurations, a peripheral device 104, 106, 108, 110, 112, 114 may transmit a LL data PDU to the central device 102 without first receiving a LL data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, 114 in the WPAN 100, the central device 102 may communicate with more or fewer than six peripheral devices within the WPAN 100 without departing from the scope of the present disclosure.

Referring again to FIG. 1, in certain aspects, the central device 102 may be configured to determine a path of trajectory of a moving wireless device (120), e.g., as described below in connection with any of FIGS. 2-9.

Figure 2:
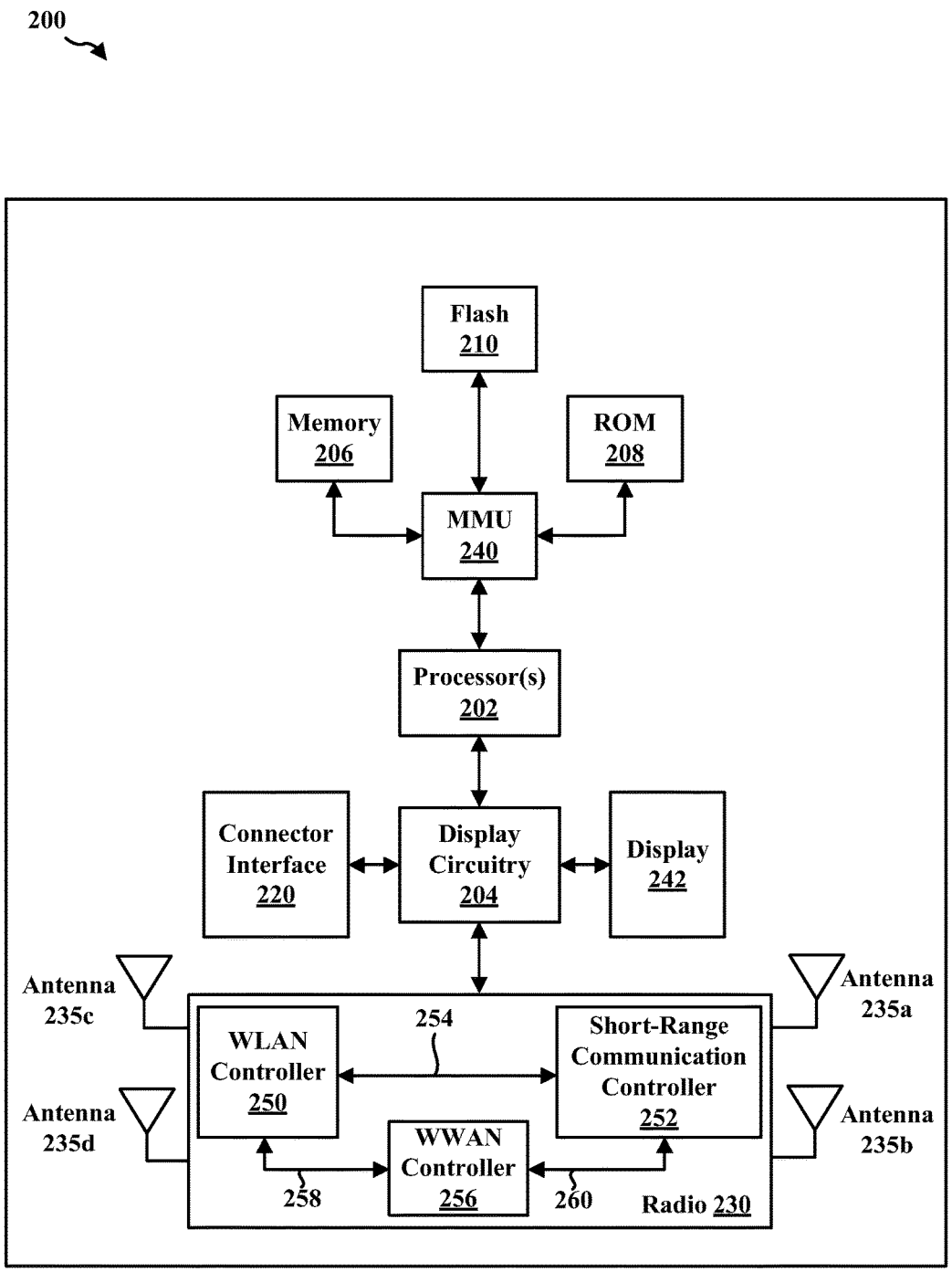
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., the central device 102, and/or one of peripheral devices 104, 106, 108, 110, 112, 114 described above in connection with FIG. 1. In certain aspects, the wireless device 200 may be a BLE enabled device.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202. In certain configurations, one or more of the processor(s) 202, memory 206, ROM 208, and/or Flash memory 210 may be configured to access one or more look-up table(s) that includes a correlation of one or more reference vectors (e.g., AoA measurements, angle of departure (AoD) measurements, RTP measurements, inertial sensor measurements, accelerometer measurements, gyroscope measurement, etc.) associated with a signal received from a transmitting device (e.g., one or more of the peripheral devices 104, 106, 108 shown in FIG. 1) to a position of the transmitting device with respect to the receiving device (e.g., central device 102 in FIG. 1).

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235a, 235b, 235c, 235d, for performing wireless communication with, e.g., wireless devices in a WPAN.

In certain aspects, the wireless device 200 may include hardware and software components (a processing element) configured to determine a path of trajectory of a moving wireless device, e.g., using the techniques described below in connection with any FIGS. 3-9. The wireless device 200 may also comprise BT and/or BLE firmware or other hardware/software for controlling BT and/or BLE operations.

The wireless device 200 may be configured to implement part or all of the techniques described below in connection with any of FIGS. 3-9, e.g., by executing program instructions stored on a memory medium (e.g., a non-transitory computer-readable memory medium) and/or through hardware or firmware operation. In other embodiments, the techniques described below in connection with any of FIGS. 3-9 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a wireless local area network (WLAN) controller 250 configured to control WLAN communications, a short-range communication controller 252 configured to control short-range communications, and a wireless wide area network (WWAN) controller 256 configured to control WWAN communications. In certain aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235a, 235b, 235c, 235d. In certain other configurations, the short-range communication controller 252 may be configured to communicate with at least one second device in a WPAN using one or more of the antennas 235a, 235b, 235c, 235d. In certain other configurations, the WWAN controller 256 may be configured to communicate with a second device in a WPAN using all of the antennas 235a, 235b, 235c, 235d. The WLAN controller 250, short-range communication controller 252, and/or the WWAN controller 256 may be configured to determine a path of trajectory of a moving wireless device.

Figure 3:
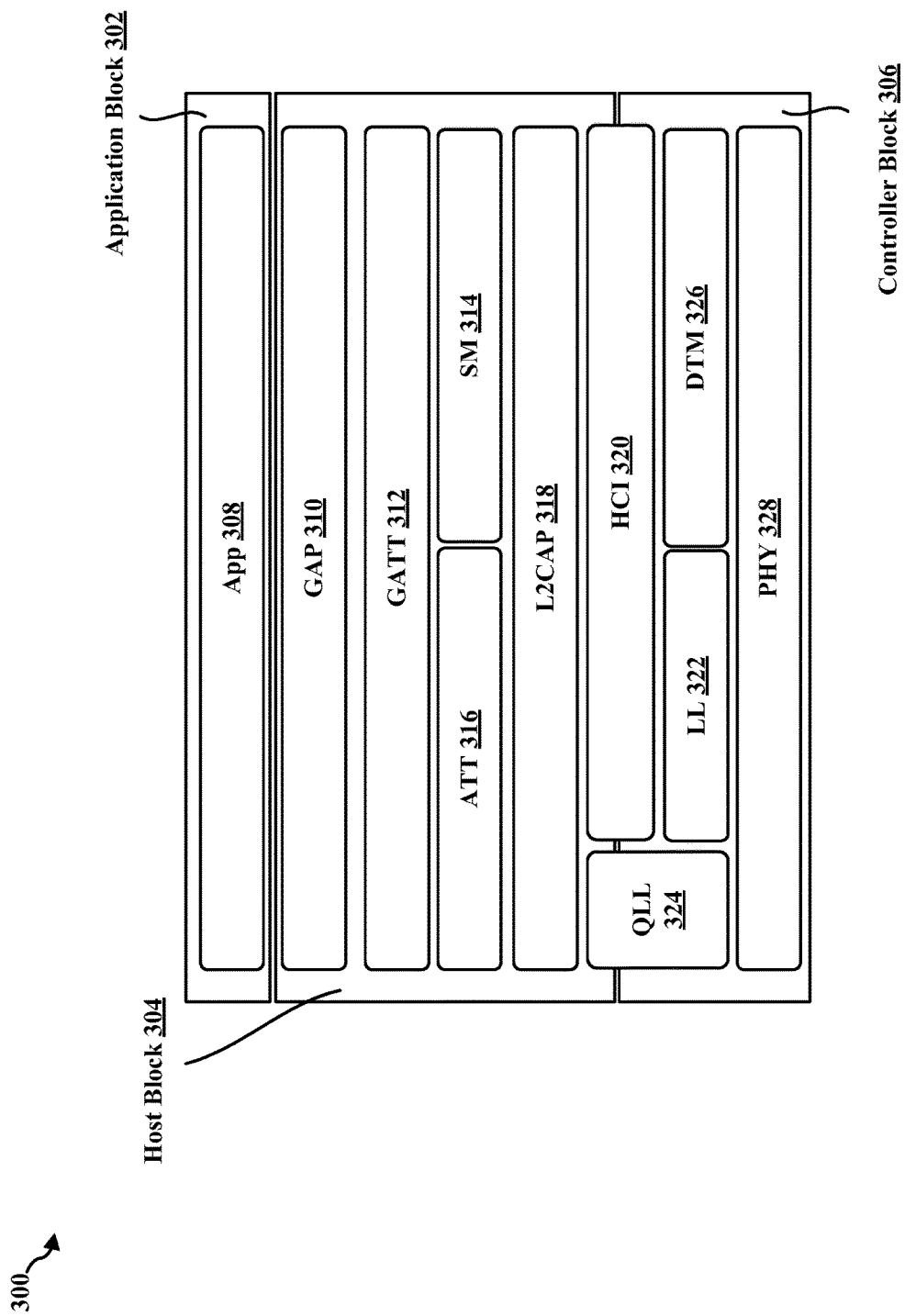
FIG. 3 is a diagram illustrating a modified BLE protocol stack in accordance with certain aspects of the disclosure.

FIG. 3 illustrates a modified BLE protocol stack 300 that may be implemented in a BLE device in accordance with certain aspects of the present disclosure. For example, the modified BLE protocol stack 300 may be implemented by, e.g., one or more of processor(s) 202, memory 206, Flash memory 210, ROM 208, the radio 230, and/or the short-range communication controller 252 illustrated in FIG. 2.

Referring to FIG. 3, the modified BLE protocol stack 300 may be organized into three blocks, namely, the Application block 302, the Host block 304, and the Controller block 306. Application block 302 may be a user application which interfaces with the other blocks and/or layers of the modified BLE protocol stack 300. The Host block 304 may include the upper layers of the modified BLE protocol stack 300, and the Controller block 306 may include the lower layers of the modified BLE protocol stack 300.

The Host block 304 may communicate with a controller (e.g., short-range communication controller 252 in FIG. 2) in a wireless device using a Host Controller Interface (HCI) 320. The HCI 320 may also be used to interface the Controller block 306 with the Host block 304. Interfacing the Controller block 306 and the Host block 304 may enable a wide range of Hosts to interface with the Controller block 306.

The Application block 302 may include a higher-level Application Layer (App) 308, and the modified BLE protocol stack 300 may run under the App 308. The Host block 304 may include a Generic Access Profile (GAP) 310, a Generic Attribute Protocol (GATT) 312, a Security Manager (SM) 314, an Attribute Protocol (ATT) 316, and a Logical Link Control and Adaptation Protocol (L2CAP) 318, each of which are described in further detail below. The Controller block 306 may include a LL 322, a proprietary LL (QLL) 324, a Direct Test Mode (DTM) 326, and a Physical Layer (PHY) 328, each of which are described in further detail below.

To support future applications (e.g., IoT applications, audio applications, etc.), the PHY 328 of the present disclosure may support an increased range of communication and data rate as compared to the PHY in a traditional BLE protocol stack. The PHY 328 may define the mechanism for transmitting a bit stream over a physical link that connects BLE devices. The bit stream may be grouped into code words or symbols, and converted to a PDU that is transmitted over a transmission medium. The PHY 328 may provide an electrical, mechanical, and procedural interface to the transmission medium. The shapes and properties of the electrical connectors, the frequency band used for transmission, the modulation scheme, and similar low-level parameters may be specified by the PHY 328.

The DTM 326 may allow testing of the PHY 328 by transmitting and receiving sequences of test packets. DTM 326 may be used in compliance and production-line testing without the need of going through the entire modified BLE protocol stack 300. In other words, the DTM 326 may skip the Host block 304 and communicate directly with the short-range communications controller of the radio (e.g., the short-range communication controller 252 and radio 230 in FIG. 2) in an isolated manner.

The LL 322 may be responsible for low level communication over the PHY 328. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the HCI 320 to communicate with upper layers of the modified BLE protocol stack 300. In certain aspects, the LL 322 may be used to generate a LL data PDU and/or an empty packet (e.g., empty PDU) that may be transmitted using a LL communication link established with another BLE device using the LL 322.

The QLL 324 is a proprietary protocol that exists alongside the LL 322. The QLL 324 may be used to discover peer proprietary devices, and establish a secure communication channel therewith. For example, the QLL 324 may be used to establish a QLL communication link between short-range communication controllers and/or proprietary controllers (not shown in FIG. 2) in two wireless devices, e.g., two Qualcomm® devices, two Apple® devices, two Samsung® devices, etc. The proprietary controllers in peer proprietary devices may communicate with each other using allocated channels, a control protocol, attributes, and procedures. Proprietary controllers may either establish a QLL communication link after a standard connection at the LL 322 has been established or over an advertising bearer. Once a QLL communication link has been established at the QLL 324, the proprietary controllers of two peer proprietary devices may be able to communicate with each other using a set of dedicated channels. Each service available at a proprietary controller may be associated with a particular channel number. A proprietary controller may include up to or more than, e.g., 127 different services. The services may include, e.g., firmware updates, licensing additional codes, and/or adding additional firmware components on peer devices just to name a few.

The L2CAP 318 may encapsulate multiple protocols from the upper layers into a LL data PDU and/or a QLL establishment PDU (and vice versa). The L2CAP 318 may also break large LL data PDUs and/or a QLL establishment PDUs from the upper layers into segments that fit into a maximum payload size (e.g., 27 bytes) on the transmit side. Similarly, the L2CAP 318 may receive multiple LL data PDUs and/or QLL establishment PDUs that have been segmented, and the L2CAP 318 may combine the segments into a single LL data PDU and/or a QLL establishment PDU that may be sent to the upper layers.

The ATT 316 may be a client/server protocol based on attributes associated with a BLE device configured for a particular purpose (e.g., monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE device are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may act as a bridge between the modified BLE protocol stack and the application and functionality of the BLE device (e.g., at least from a wireless connection point of view), and is defined by the profile.

The GAP 310 may provide an interface for the App 308 to initiate, establish, and manage connection with counterpart BLE devices.

Recent developments in short-range communication have enabled BT and/or BLE enabled wireless devices to determine the AoA of a signal received from another wireless device and a straight line distance to another wireless device. The straight line distance may be determined based at least in part on, e.g., the RTP measurements of a set of signals communicated between the two wireless devices. A wireless device may determine a vector distance to another wireless device, e.g., based at least in part on the AoA measurement(s) and/or RTP measurement(s).

While the use AoA measurements and RTP measurements in distance determination may be beneficial, AoA measurements and/or RTP measurements are nevertheless subject to errors and outages caused by, e.g., multipath interference, particularly deep fading. In addition, AoA measurements and RTP measurements may also be subject to limitations due to the finite measurement interval (e.g., time period) used to determine the AoA and RTP of a signal or set of signals. While AoA measurements and/or RTP measurements may be used in determining a distance to another wireless device, these measurements may not provide information related to the orientation of a wireless device.

In certain implementations, a wireless device may include one or more inertial sensors (e.g., accelerometer, gyroscope, magnetometer etc.) that may be used for tracking orientation and/or position. The accuracy of inertial measurements may, however, be limited based on the lack of known zero-velocity points, and hence, the lack of constraints may impart errors in the determination of orientation and/or position. Additional details associated with AoA measurements, RTP measurements, and/or inertial measurements are described below in connection with FIG. 4.

Figure 4:
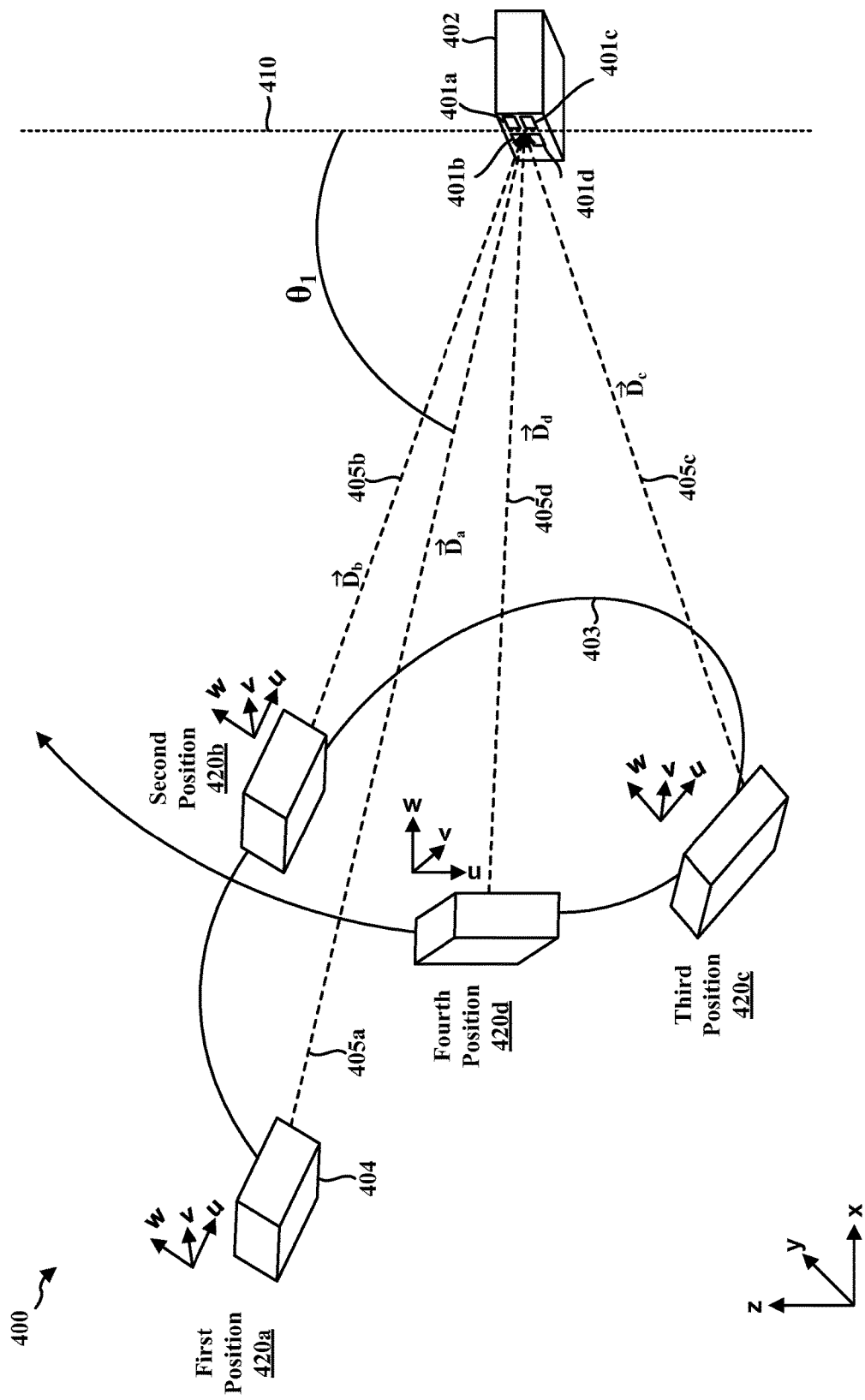
FIG. 4 illustrates a wireless network that includes a first wireless device and a second wireless device in accordance with certain aspects of the disclosure.

FIG. 4 illustrates a wireless network 400 that includes a first wireless device 402 (e.g., a stationary wireless device such as a game console) and a second wireless device 404 (e.g., such as a mobile device or wireless remote control) in accordance with certain aspects of the disclosure. The wireless network 400 may include, e.g., a WPAN. The first wireless device 402 may correspond to, e.g., the central device 102, the wireless device 200, 500, the first wireless device 602, the apparatus 802/802'. The first wireless device 402 may include a plurality of antennas 401a, 401b, 401c, 401d that are part of an antenna array. The second wireless device 404 may correspond to, e.g., the peripheral device 104, 106, 108, the wireless device 200, the second wireless device 604, 850. The second wireless device 404 may include a single antenna (not shown in FIG. 4) or an antenna array (not shown in FIG. 4).

In certain configurations, the first wireless device 402 may receive a first signal 405a from the second wireless device 404 at the first position 420a, a second signal 405b from the second wireless device 404 at the second position 420b, a third signal 405c from the second wireless device 404 at the third position 420c, and a fourth signal 405d from the second wireless device at the fourth position 420d. Each of the signals 405a, 405b, 405c, 405d may include an audio signal, a control signal, a data signal, an inertial sensor measurement, etc. In addition, each of the signals 405a, 405b, 405c, 405d may include a single signal or a set of signals (e.g., inertial sensor information, RTP signals, AoA signals, etc.)

In certain configurations, the first wireless device 402 may determine a perceived spatial placement of the second wireless device 404 based on the AoA of the signal 405a received at a particular position. In certain aspects, the first wireless device 402 may determine the perceived spatial placement of the second wireless device 404 at the first position 420a based at least in part on the AoA (e.g., $\theta_1$) of the received signal 405a with respect to reference point 410. Additionally and/or alternatively, the first wireless device 402 may determine the perceived spatial placement of the second wireless device 404 at the first position 420a based at least in part on the AoD (e.g., not illustrated in FIG. 4) of the received signal 405a with respect to a reference point (not illustrated in FIG. 4) of the second wireless device 404.

In certain aspects, the first wireless device 402 may determine the AoA and/or AoD of signal 405a based at least in part on the signal phase that is received at each antenna 401a, 401b, 401c, 401d. The phase differences between each antenna may be converted to an AoA measurement by the first wireless device 402. Although the antenna array of the first wireless device 402 is depicted with four antennas 401a, 401b, 401c, 401d, any number of antennas may be included in the antenna array without departing from the scope of the present disclosure.

Consider, for example, an antenna array with two antennas 401a, 401b spaced apart by one-half the wavelength of the signal 405a (e.g., an RF wave). If the RF wave is incident upon the antenna array at boresight (e.g., the axis of symmetry of the antenna array), the signal 405a may arrive at each antenna 401a, 401b concurrently, thus yielding a 0° phase-difference that is measured by the first wireless device 402. A 0° phase-difference may be equivalent to an AoA of 0° (e.g., $\theta_1$=00). If the RF wave is incident upon the antenna array at broadside (e.g., perpendicular to the axis of symmetry of the first wireless device 402), then a 180° phase difference between the antennas 401a, 401b may correspond to $\theta_1$=90°.

In certain configurations, the first wireless device 402 may determine the AoA and/or AoD from a look-up table that includes a correlation of the determined phase differences between the antennas and the AoA/AoD of the signal 405a. The look-up table may be maintained by the first wireless device 402 or at a remote location accessible by the first wireless device 402.

In certain implementations, the first wireless device 402 may use RTP measurements in order to determine a distance to the second wireless device 404. The first wireless device 402 may obtain RTP measurements when a pair of tone signals are communicated between the first wireless device 402 and the second wireless device 404 using the same carrier frequency. For example, the first wireless device 402 may send a tone signal to the second wireless device 404. The second wireless device 404 may respond by sending a tone signal at nominally the same frequency to the first wireless device 402. A tone may include a simple sinusoid at a particular frequency, and each of the wireless devices may determine the in-phase and quadrature (I,Q) data associated with a received tone signal may be estimated when the correct tone is removed from the incoming signal by the receiving device. The first wireless device 402 may determine the distance to the second wireless device 404 based at least in part on a phase difference of the tone signals communicated between the two devices. The first wireless device 402 may determine the phase difference based at least in part on the I/Q data associated with the two tone signals. In certain configurations, the first wireless device 402 may determine the distance to the second wireless device 404 from a look-up table that includes a correlation of phase differences of RTP measurements and distance. The look-up table may be maintained by the first wireless device 402 or at a remote location accessible by the first wireless device 402.

When using RTP measurements to determine distance, the first wireless device 402 may assume that both wireless devices are stationary, which may not always be the case, as in the example illustrated in FIG. 4. In practice, the phase measurements (e.g. RTP measurement of the different tone frequencies) may be made sequentially over a period of time and if either the first wireless device 402 or the second wireless device 404 is moving, the RTP measurements may not be associated with the same position of the second wireless device 404, thereby corrupting the final distance estimation.

As illustrated in FIG. 4, the first wireless device 402 is stationary (e.g., a video game console) and the second wireless device 404 (e.g., a handheld device) is moving. The first wireless device 40s may use AoA measurements and/or RTP measurements to determine a vector distance (e.g., Da, Db, Dc, Dd) to the second wireless device 404, and the second wireless device 404 may use inertial sensors (e.g., located at the second wireless device 404) to track attitude information (e.g., roll, pitch, and yaw). As illustrated in FIG. 4, the second wireless device 404 is moving in a trajectory 403, and its orientation with respect to the x, y, and z axes are changing.

The second wireless device 404 may use the gyroscope to determine motion data while moving about all three axes (e.g., x, y, and z). The gyroscope may include vibrating components that are used to determine motion data about the three axes. As the second wireless device 404 changes direction, the vibrations in the vibrating components may deviate, and the deviations may be measured and used to calculate directional change data. In order to account for drift, which may cause erroneous directional change data, the second wireless device 404 may use one or more of an accelerometer and/or a magnetometer. The accelerometer may use gravity to serve as an attitude reference, whereas the magnetometer may use the Earth's magnetic field to provide heading information associated with the motion of the second wireless device 404. The second wireless device 404 may use the data collected from each of the gyroscope, the accelerometer, and/or the magnetometer to determine attitude information. In the absence of a magnetometer, the yaw of the second wireless device 404 with respect to north may be unknown. However, the direction of gravity may still be used to determine tilt and changes in attitude may be tracked by the gyroscope.

However, while the AoA measurements and RTP measurements may be used to determine a relative position and/or a distance to the other device, and the inertial sensor measurements may be used to determine tilt and attitude change associated with the second wireless device 404, there may be no mechanism to determine and/or estimate the trajectory 403 of the second wireless device 404. There is a need to determine and/or estimate the trajectory 403 of a wireless device in order to increase the accuracy and dynamic performance of the wireless network 400 (e.g., by mitigating errors in the AoA measurements, RTP measurements, and to infill between the AoA/RTP observations), in order to provide new use cases such as, e.g., gesture detection.

The present disclosure provides a solution by augmenting AoA measurements and RTP measurements with inertial sensor data in order to determine and/or estimate a trajectory of a moving wireless device, e.g., as described below in connection with FIGS. 5-9.

Figure 5:
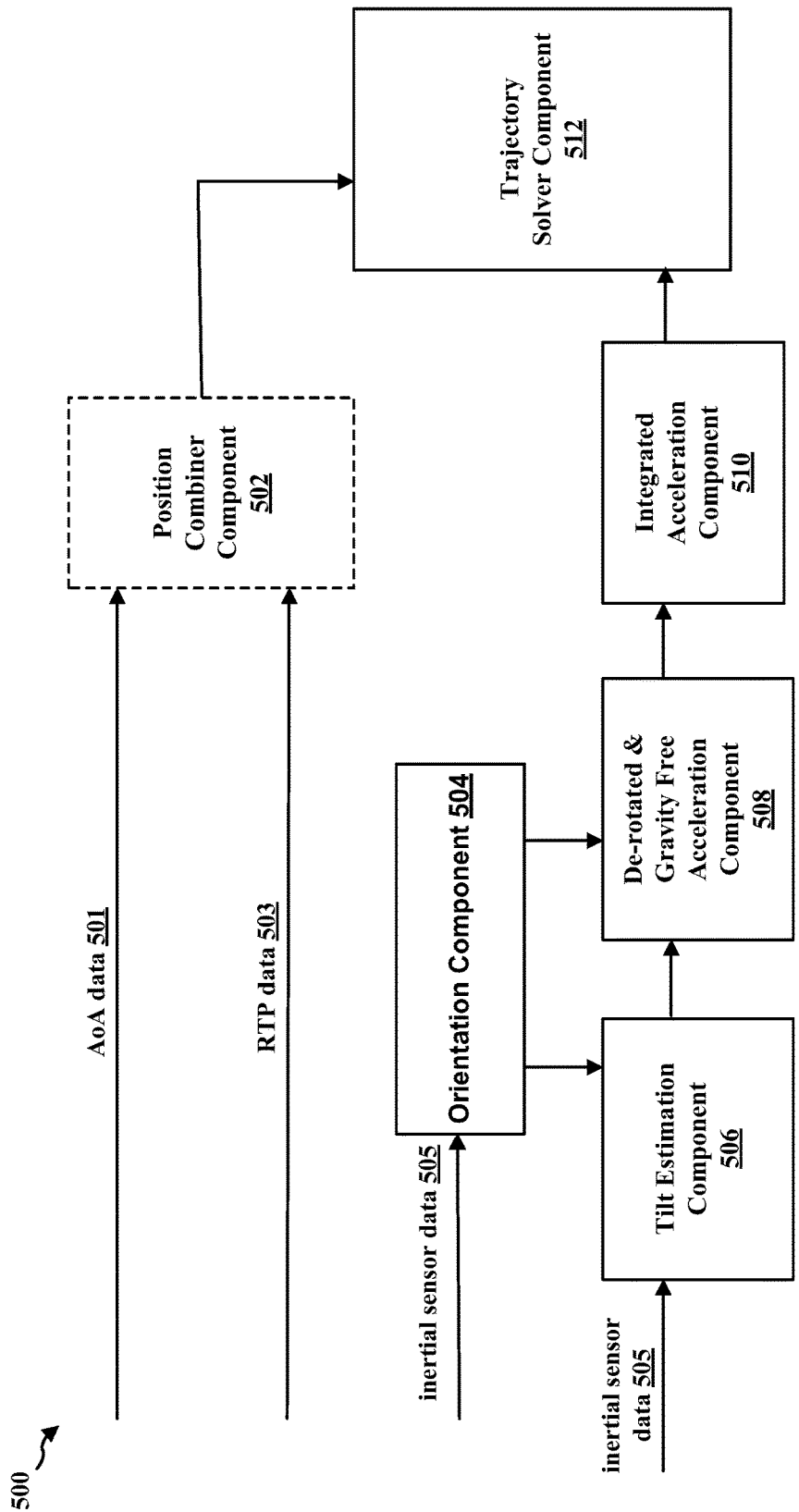
FIG. 5 illustrate a simplified block diagram of a wireless device that may be used to determine the trajectory of a moving wireless device in accordance with certain aspects of the disclosure.

FIG. 5 illustrate a simplified block diagram of a wireless device 500 that may be configured to determine the trajectory of a moving wireless device (e.g., the second wireless device 404 illustrated in FIG. 4) in accordance with certain aspects of the disclosure. The wireless device 500 may correspond to, e.g., the central device 102, the wireless device 200, the first wireless device 402, 602, the apparatus 802/802'. The moving wireless device may correspond to, e.g., the peripheral device 104, 106, 108, the wireless device 200, the second wireless device 604, 850.

The wireless device 500 illustrated in FIG. 5 may be configured determine a trajectory of a moving wireless device (e.g., second wireless device 404 illustrated in FIG. 4) by combining the AoA measurements, RTP measurements, and inertial sensor measurements. The AoA measurements and RTP measurements may provide some, but not all, constraints used in determining trajectory. In addition, the wireless device 500 may not use magnetometer data due to the challenges of maintaining accurate magnetic calibration caused by, e.g., the variability of magnetic fields indoors and to avoid the need to determine the absolute orientation with respect to north of both the moving and stationary wireless devices. However, although the magnetometer data may not be used in determining trajectory, additional unknowns may be introduced into the calculation to compensate.

As inputs, the wireless device 500 may use AoA measurements, RTP measurements, accelerometer data, and gyroscope data in order to determine a trajectory of a moving wireless device. In the example(s) described below in connection with FIGS. 5 and 6, the accelerometer used to obtain the accelerometer data and the gyroscope used to determine the gyroscope data may be assumed to be calibrated. In FIG. 5, the position combiner component 502 may be used to determine combined position information using the AoA data and RTP data. However, the position combiner component 502 may be optional depending on how the wireless device 500 determines the position (e.g., distance, relative position with respect to a reference point, etc.) of the moving wireless device. In implementations in which the wireless device 500 uses position level combining to determine trajectory, the position combiner component 502 may be used. In implementations in which the wireless device 500 uses system level combining or measurement level combining the position combiner component 502 may be omitted or used to provide an initial starting point for the cost function minimizer.

The inertial sensor data 505 (e.g., gyroscope data and accelerometer data), received from the moving wireless device, may be by the orientation component 504 to determine an orientation of the moving wireless device. Information associated with the orientation of the moving wireless device may be input to the tilt estimation component 506 and/or the de-rotated and gravity free acceleration component 508. It should be noted that the accelerometer at the moving wireless device may measure both gravity and acceleration, and the two measurements may be intertwined. To isolate gravity, the tilt estimation component 506 may estimate tilt (e.g., the roll and pitch of the moving wireless device), or equivalently the down direction z in terms of u, v, and w.

In certain configurations, tilt estimation component 506 may estimate tilt during a period of sensor inactivity (e.g., 10 ms). Sensor inactivity may be defined as relatively low gyroscope activity, and/or when the magnitude of the acceleration is approximately constant and close to 1 g.

The tilt estimation component 506 may estimate tilt using an average of the acceleration of the moving wireless device integrated over a time period in the spatial frame (e.g., the x, y, z frame). The tilt estimation component 506 may estimate tilt under the assumption that in the global frame there is a relatively low average acceleration over a relatively long interval. Otherwise, there may be a sizeable net change in velocity. In certain other configurations, the tilt estimation component 506 may estimate tilt using a mid-term average of the acceleration integrated in the spatial frame in the presence of periodic motion (e.g., such as stepping). If the integration takes place over a multiple of the main periodicity present, the wireless device 500 may assume that average acceleration is zero, again equivalent to a zero velocity change assumption. In such a configuration, the wireless device 500 may include an additional step detector system component, not illustrated in FIG. 5.

Upon estimating the tilt of the moving wireless device at each point in time, the tilt estimation component 506 may determine an attitude data of the moving wireless device relative to an arbitrary yaw angle (e.g., with an unknown orientation of the moving wireless device in the x, y plane) at each point in time. In certain implementations, the tilt estimation component 506 may buffer and batch process the inertial sensor data 505 in order to propagate tilt constraints both forwards and backwards in time. For example, a short stationary period near the end of the estimation interval may be beneficial in constraining the tilt for the earlier times. The tilt estimation component 506 may send the relative attitude information and/or the tilt estimation to the de-rotated and gravity free acceleration component 508.

The de-rotated and gravity free acceleration component 508 may use the relative attitude information and/or tilt estimation received from the tilt estimation component 506 to de-rotate the accelerometer data and remove the gravity portion of the orientation and inertial information received from the orientation component 504.

The de-rotated and gravity free acceleration information may be sent to the integrated acceleration component 510. The integrated acceleration component 510 may double integrate the remaining acceleration in the orientation information received from the de-rotated and gravity free acceleration component 508 in order to determine sensor derived trajectory information, which may include the local trajectory to within an unknown position with a constant velocity and yaw.

The local trajectory determined by the integrated acceleration component may be represented by equation 1 seen below, where $\hat{v}$ may be an unknown velocity, $\hat{s}$ may be an unknown position, $\underline{a}(t)$ may be the accelerometer observations, $\underline{g}$ may be the gravity vector, P(t) may be the rotation matrix from an attitude filter (e.g., P(t) may have an arbitrary yaw but an accurately estimated pitch and roll), $Y(\hat{\theta})$ is a matrix representing a global rotation of the whole trajectory of the moving wireless device due to the unknown yaw, and $\hat{r}(t)$ is the estimated trajectory of the moving wireless device (e.g., with respect to wireless device 500).

$$\hat{r}(t) = Y(\hat{\theta})\left(\int\int_{-t}^{0}(P(t)\underline{a}(t) - \underline{g})dt + \hat{v}t + \hat{s}\right) \quad \text{equation 1}$$

Equation 1 may be an estimate of the recent trajectory from time −t until the present time (e.g., time 0) but with several unknowns. The integrated acceleration component 510 may input information associated with the local trajectory with the unknowns described in connection with equation 1 into the trajectory solver component 512.

To estimate the unknowns and determine the overall trajectory, the trajectory solver component 512 may combine the sensor derived trajectory information (e.g., received from the integrated acceleration component 510 with the absolute constraints of the AoA measurements and RTP measurements received from the position combiner component 502 (e.g., or from an AoA measurement component and RTP measurement component when the position combiner component 502 is omitted).

The trajectory solver component 512 may combine the sensor derived trajectory with the absolute constraints of the AoA measurements and RTP measurements using a cost function approach. Using a cost function approach may enable several useful extensions and also may enable to the trajectory solver component 512 to address the non-linearity caused by the unknown yaw in the P(t) term in equation 1.

At this point, the trajectory solver component 512 may use one of several example techniques to determine the trajectory of the moving wireless device that represent a trade-off between accuracy and numerical complexity. The trade-off between accuracy and numerical complexity may occur because the RTP measurement in particular is not instantaneous but may be made over a period of time (e.g., 1 ms, 5 ms, 10 ms, etc.). During the period of time over which the RTP measurement is made, the position of the moving wireless device may have changed, and hence, additional numerical complexity may be needed to increase the accuracy of the trajectory determination. For example, when the moving wireless device is moving at 2 m/s, the moving wireless device may move by 1 cm in a 5 ms time period. In other words, the change in position may introduce errors into the position calculation performed by the trajectory solver component 512. However, when the trajectory information been known a-priori (e.g., based on a previous trajectory determined by the trajectory solver component 512), the trajectory solver component 512 may use the a-priori trajectory to improve the position fix.

A second effect of making the RTP measurement over a period of time may be that the AoA measurement and the RTP measurement may not be contemporaneous. In accordance with certain aspects of the present disclosure, the AoA measurement and the RTP measurement may be obtained relatively close together (e.g., 1 ms apart), however, it may be beneficial in terms of accuracy to determine position as if they AoA measurement and the RTP measurement were taken contemporaneously. The various examples of how the trajectory solver component 512 may determine the trajectory (e.g., trajectory 403 in FIG. 4) will now be described in additional detail.

In a first example that uses position level combining, the position combiner component 502 may combine the AoA data 501 and the RTP data 503 into a single position estimate at time $t_n$ of $\underline{S}_n$. In certain configurations, the position combiner component 502 may be used to convert the AoA measurement(s) and RTP measurement(s) into vector locations, as described below in connection with equations 2 and 3, where $\underline{A}(t)$ is the known trajectory information, $\underline{a}(t)$ are the accelerometer observations, $\underline{g}$ is the gravity vector, and P(t) is the rotation matrix from an attitude filter (e.g., P(t) may have arbitrary yaw but known pitch and roll) integrated from a previous time of −t to the present time of t=0. In equation 3, E may be the overall cost to minimize, $w(t_n)$ may be a weighting function that determines how to down-weight the importance of a past trajectory estimation, and $\sigma_n^2$ may be the estimated variance associated with a particular AoA measurement and/or RTP measurement.

$$\underline{A}(t) = \int\int_{-t}^{0}(P(t)\underline{a}(t) - \underline{g})dt \quad \text{equation 2}$$

$$E = \sum_n \frac{w(t_n)}{\sigma_n^2}|Y(\hat{\theta})(\underline{A}(t_n) + \hat{v}t_n + \hat{s}) - \underline{S}_n|^2 \quad \text{equation 3}$$

Equation 3 may represent a function to be minimized with respect to vectors $\hat{s}$, $\hat{v}$ and $\hat{\theta}$, as described in connection with equation 1. Minimization with respect to vectors $\hat{s}$, $\hat{v}$ and $\hat{\theta}$ may be achieved using, e.g., conjugate gradient or iteratively when the yaw is fixed. Minimization with respect to vectors $\hat{\underline{s}}$, $\hat{\underline{v}}$ may include the inversion of 3 2×2 matrices. Minimization with respect to yaw may be achieved because the trajectory solver component 512 may determine yaw over the full domain of $\hat{\theta}$, using predetermined values of cosine and sine.

Once the minimization of $\hat{\underline{s}}$, $\hat{\underline{v}}$ and $\hat{\theta}$ has been performed, the trajectory solver component 512 may obtain an estimate both of the current position of the moving wireless device and also of the previous trajectory determination. In certain implementations, the trajectory solver component 512 may input the resultant trajectory information back to the AoA measurement component, RTP measurement component, and/or position combiner component 502, that may be used to obtain a refined estimate of position. The refined estimate of position may then either be used for the next trajectory determination or the minimization resolved for the current trajectory determination using the refined estimate of position.

In a second example that uses system level combining, the trajectory solver component 512 may receive the AoA measurement from an AoA measurement component and the RTP measurement from an RTP measurement component separately. Because the AoA and RTP may be measured independently, and as mentioned above, determining trajectory without position level combing may increase then numerical complexity of determining the trajectory. In the second example, the trajectory solver component 512 may determine the trajectory using equation 4, where E may be the cost function that represents the overall cost to be minimized, $\hat{\underline{r}}(t_n)$ may be the estimated trajectory location at time $t_n$, $\hat{\underline{r}}(t_m)$ may be the estimated trajectory location at time $t_m$, n sums over the RTP measurement(s), m sums over the AoA measurement(s), $\sigma_{n,RTP}^2$ may be the variance of the RTP measurement(s), $\sigma_{n,AoA}^2$ may be the variance of the AoA measurement(s) measurement, $\underline{N}_m$ may be a unit vector pointing in the direction of AoA measurement(s) m, and $D_n$ is distance measurement based on the RTP.

$$E = \sum_n \frac{w(t_n)}{\sigma_{n,RTP}^2}(|\hat{\underline{r}}(t_n)| - D_n)^2 + \sum_m \frac{2w(t_m)}{\sigma_{m,AoA}^2}\left(\frac{\hat{\underline{r}}(t_m)}{|\hat{\underline{r}}(t_m)|} \cdot \underline{N}_m - 1\right) \quad \text{equation 4}$$

Determining the trajectory using equation 4 may be tractable numerically by direct minimization but may not be amenable to simple linear algebra, which may increase the numerical complexity of the trajectory determination.

In a third example that uses measurement level combining, the trajectory solver component 512 may determine the trajectory of the moving device by combining the multiple individual phase observations within a set of RTP measurements that may be used to determine the distance between the two wireless devices at each RTP measurement. Because the RTP measurements are not taken instantaneously, the position of the moving wireless device may change between RTP measurements in the set of RTP measurements. Additional details of the third example of trajectory determination that uses measurement level combining by the trajectory solver component 512 are described in connection with FIG. 6.

Figure 6:
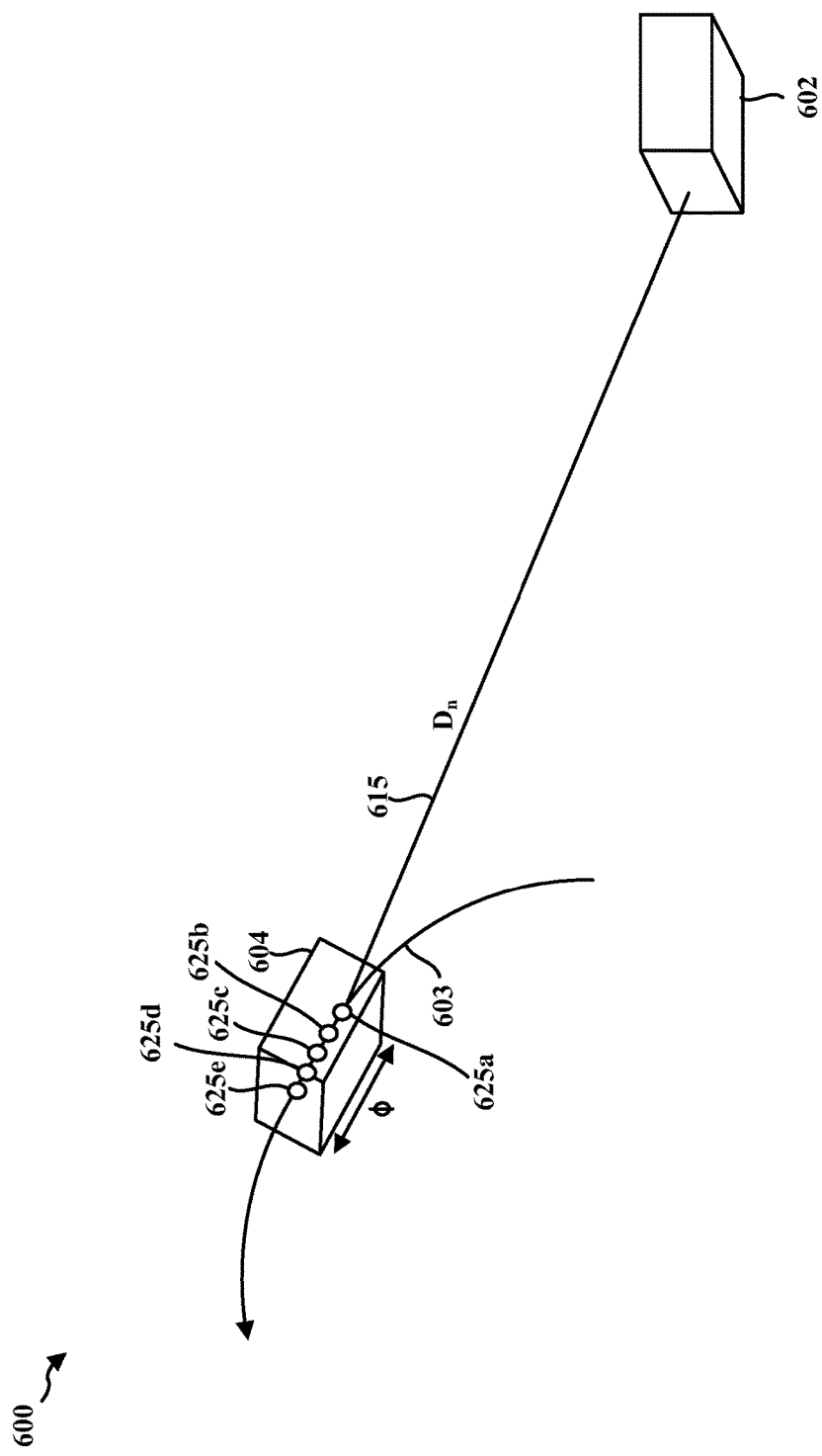
FIG. 6 illustrates a wireless network that includes a first wireless device and a second wireless device in accordance with certain aspects of the disclosure.

FIG. 6 illustrates a wireless network 600 that includes a first wireless device 602 (e.g., a stationary wireless device such as a game console) and a second wireless device 604 (e.g., such as a mobile device such as a smart phone or wireless remote control) in accordance with certain aspects of the disclosure. The wireless network 600 may include, e.g., a WPAN. The first wireless device 602 may correspond to, e.g., the central device 102, the wireless device 200, 500, the first wireless device 402, the apparatus 802/802'. The first wireless device 602 may include a plurality of antennas (e.g., antennas 401a, 401b, 401c, 401d in FIG. 4) that are part of an antenna array. The second wireless device 604 may correspond to, e.g., the peripheral device 104, 106, 108, the wireless device 200, the second wireless device 404, 850. The second wireless device 604 may include a single antenna (not shown in FIG. 6) or an antenna array (not shown in FIG. 6).

The first wireless device 602 (e.g., the trajectory solver component 512 in FIG. 5) may estimate the distance $D_n$ 615 at a time corresponding to each phase observation 625a, 625b, 625c, 625d, 625e. In the third example, $D_n$ 615 may be a function of both the phase at a particular phase observation 625a, 625b, 625c, 625d, 625e, and the hypothetical trajectory at each of the phase observations 625a, 625b, 625c, 625d, 625e. $D_n$ may be determined using a component of the hypothetical velocity along the distance vector, and an adjustment to the observed phase that shifts the phase to the end time (e.g., the time of phase observation 625e) according to the time delta and projected speed. The projected phase may be represented by equation 5, where $\phi$ is the projected phase, $\rho$ is the phase at a particular observation, $\underline{v}(t)$. $\hat{\underline{D}}$ may be the projected line of sight speed, $\Delta t$ may be the time interval, and $\lambda$ may be the Bluetooth wavelength.

$$\phi = \rho + 4\pi\Delta t \underline{v}(t) \cdot \hat{\underline{D}}/\lambda \quad \text{equation 5}$$

The projected phase $\phi$ may be incorporated into the minimization loop, represented by equation 6, that may be used by the trajectory solver component of the first wireless device 602 in order to determine the estimated trajectory 603. In equation 6, E may be the overall cost (e.g., the cost function) to minimize, $\hat{\underline{r}}(t)$ may be the estimated trajectory of the second wireless device 604 with respect to the first wireless device 602, $\hat{\underline{r}}(t_n)$ may be the estimated trajectory location at time $t_n$, $\hat{\underline{r}}(t_m)$ may be the estimated trajectory location at time $t_m$ $w(t_n)$ may be a weighting function that determines how to down-weight the importance of a past trajectory estimation, $\sigma_n^2$ may be the estimated variance associated with a particular AoA measurement and/or RTP measurement, $\phi$ may be the projected phase at the last phase measurement 625e, $D_n$ is the estimated distance at a particular phase observation, and $\underline{N}_m$ may be a unit vector pointing in the direction of AoA measurement(s) m.

$$E = \sum_n \frac{w(t_n)}{\sigma_{n,RTP}^2} \quad \text{equation 6}$$

$$\left(|\hat{\underline{r}}(t_n)| - D_n(\hat{\underline{r}}, \{\phi\})^2 + \sum_m \frac{2w(t_m)}{\sigma_{m,AoA}^2}\left(\frac{\hat{\underline{r}}(t_m)}{|\hat{\underline{r}}(t_m)|} \cdot \underline{N}_m - 1\right)\right)$$

Using the cost function represented by equation 6, the first wireless device 602 may be able to determine the estimated trajectory 603 of the second wireless device 604. For example, by minimizing the cost function (e.g., equation 6) though adjustment of the unknowns the first wireless device 602 may determine the values of the unknowns that best explain the observed data. Once the best values have been determined, the first wireless device 602 may use equation 1, evaluated at the best estimates for the unknowns, to provide a final estimate of the trajectory 603 of the second wireless device 604. The third example described in connection with FIG. 6 may yield the most accurate estimate of trajectory of the three examples described above. However, using the techniques of the third example may increase the numerical complexity of the determination, and increase the coupling between the components described in connection with FIG. 5. Additionally, using the techniques of the third example, the first wireless device 602 may incorporate a refinement of the AoA angles based on the solved positions and the calibration information.

Using the above techniques described in connection with FIGS. 5 and 6, a wireless device of the present disclosure may be able to determine a path of trajectory of a moving wireless device that mitigates errors in the AoA measurements, RTP measurements, and infills between the AoA/RTP observations in order to open up new use cases such as, e.g., gesture detection.

Figure 7A:
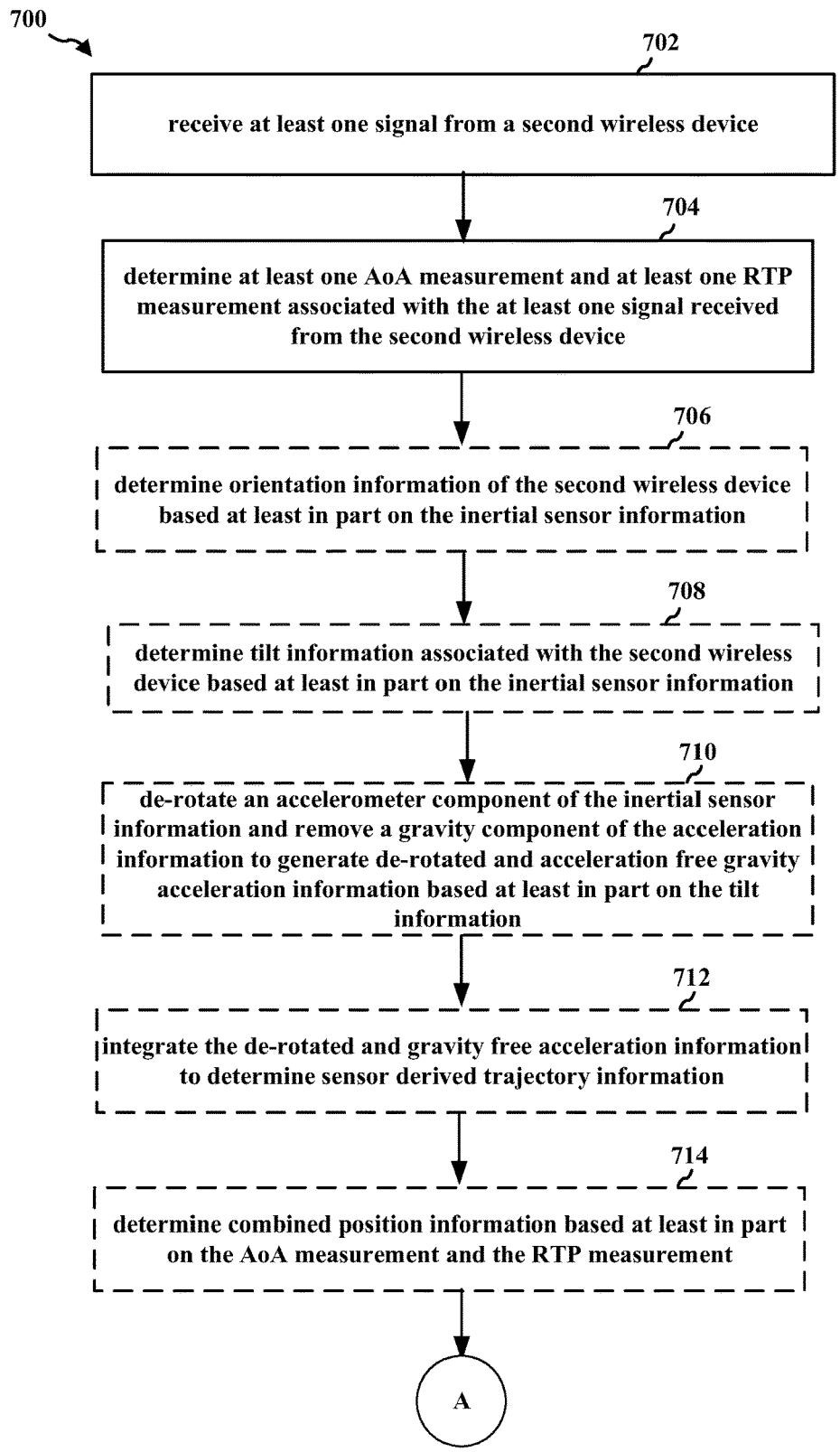
FIGS. 7A and 7B are a flowchart of a method of wireless communication.
Figure 7B:
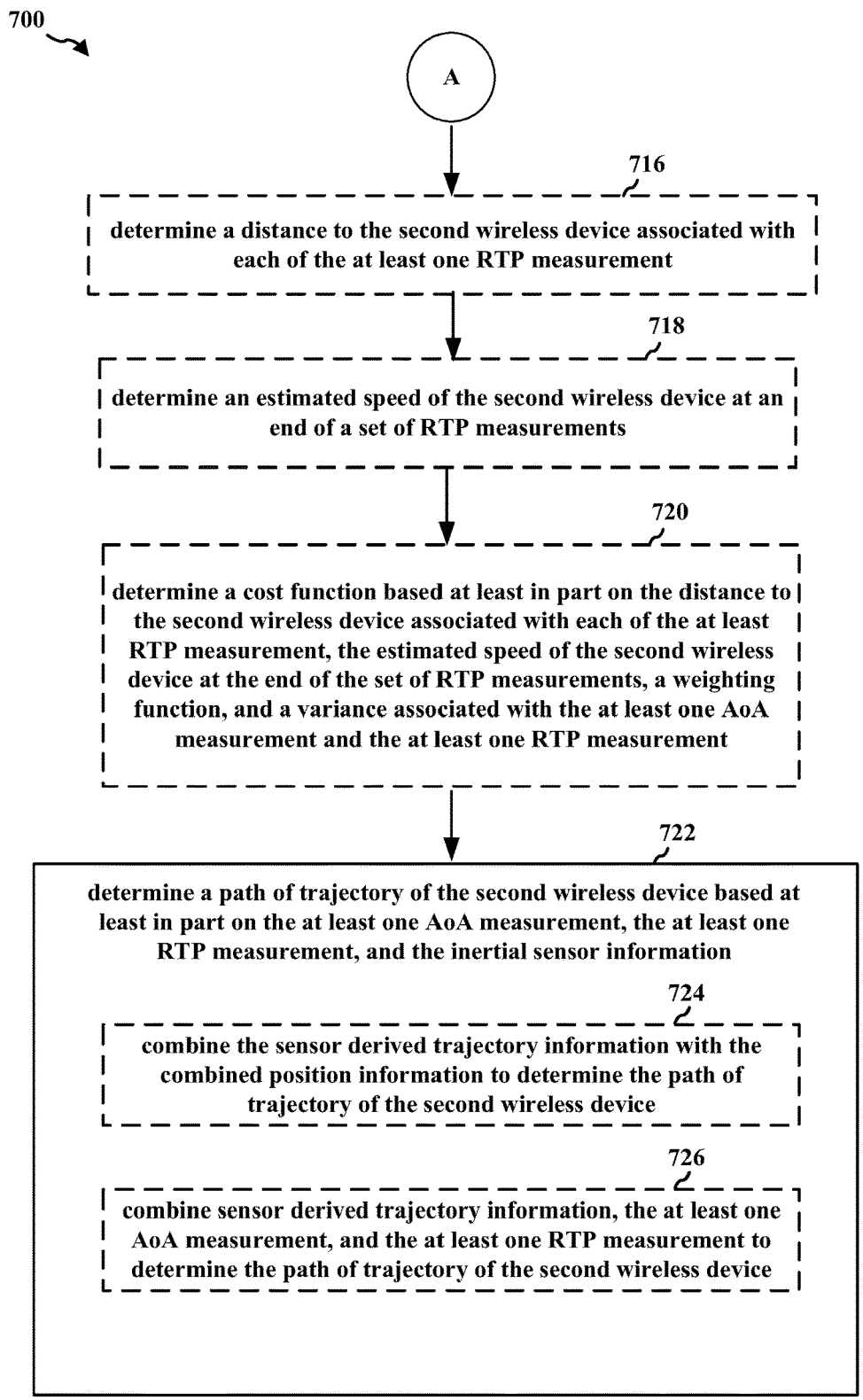

FIGS. 7A and 7B are a flowchart 700 of a method of wireless communication. The method may be performed by a wireless device (e.g., the central device 102, the wireless device 200, 500, the first wireless device 402, 602, the apparatus 802/802'). In FIGS. 7A and 7B, optional operations are indicated with dashed lines.

Referring to FIG. 7A, at 702, the first wireless device may receive at least one signal from a second wireless device. In certain aspects, the at least one signal including one or more of RTP information or inertial sensor information. For example, referring to FIG. 4, the first wireless device 402 may receive a first signal 405a from the second wireless device 404 at the first position 420a, a second signal 405b from the second wireless device 404 at the second position 420b, a third signal 405c from the second wireless device 404 at the third position 420c, and a fourth signal 405d from the second wireless device at the fourth position 420d. Each of the signals 405a, 405b, 405c, 405d may include an audio signal, a control signal, a data signal, an inertial sensor measurement, etc. In addition, each of the signals 405a, 405b, 405c, 405d may include a single signal or a set of signals (e.g., inertial sensor information, RTP signals, AoA signals, etc.)

At 704, the first wireless device may determine at least one AoA measurement and at least one RTP measurement associated with the at least one signal received from the second wireless device. For example, referring to FIG. 4, the first wireless device 402 may determine a perceived spatial placement of the second wireless device 404 based on the AoA of the signal 405a received at a particular position. In certain aspects, the first wireless device 402 may determine the perceived spatial placement of the second wireless device 404 at the first position 420a based at least in part on the AoA (e.g., $\theta_1$) of the received signal 405a with respect to reference point 410. Additionally and/or alternatively, the first wireless device 402 may determine the perceived spatial placement of the second wireless device 404 at the first position 420a based at least in part on the AoD (e.g., not illustrated in FIG. 4) of the received signal 405a with respect to a reference point (not illustrated in FIG. 4) of the second wireless device 404. In certain aspects, the first wireless device 402 may determine the AoA and/or AoD of signal 405a based at least in part on the signal phase that is received at each antenna 401a, 401b, 401c, 401d. The phase differences between each antenna may be converted to an AoA measurement by the first wireless device 402. Although the antenna array of the first wireless device 402 is depicted with four antennas 401a, 401b, 401c, 401d, any number of antennas may be included in the antenna array without departing from the scope of the present disclosure. Consider, for example, an antenna array with two antennas 401a, 401b spaced apart by one-half the wavelength of the signal 405a (e.g., an RF wave). If the RF wave is incident upon the antenna array at boresight (e.g., the axis of symmetry of the antenna array), the signal 405a may arrive at each antenna 401a, 401b concurrently, thus yielding a 0° phase-difference that is measured by the first wireless device 402. A 0° phase-difference may be equivalent to an AoA of 0° (e.g., $\theta_1=0°$). If the RF wave is incident upon the antenna array at broadside (e.g., perpendicular to the axis of symmetry of the first wireless device 402), then a 180° phase difference between the antennas 401a, 401b may correspond to $\theta_1=90°$. In certain configurations, the first wireless device 402 may determine the AoA and/or AoD from a look-up table that includes a correlation of the determined phase differences between the antennas and the AoA/AoD of the signal 405a. The look-up table may be maintained by the first wireless device 402 or at a remote location accessible by the first wireless device 402. In certain implementations, the first wireless device 402 may use RTP measurements in order to determine a distance to the second wireless device 404. The first wireless device 402 may obtain RTP measurements when a pair of tone signals are communicated between the first wireless device 402 and the second wireless device 404 using the same carrier frequency. For example, the first wireless device 402 may send a tone signal to the second wireless device 404. The second wireless device 404 may respond by sending a tone signal at nominally the same frequency to the first wireless device 402. The first wireless device 402 may determine the distance to the second wireless device 404 based at least in part on a phase difference of the tone signals communicated between the two devices. The first wireless device 402 may determine the phase difference based at least in part on the I/Q data associated with the two tone signals. In certain configurations, the first wireless device 402 may determine the distance to the second wireless device 404 from a look-up table that includes a correlation of phase differences of RTP measurements and distance. The look-up table may be maintained by the first wireless device 402 or at a remote location accessible by the first wireless device 402.

At 706, the first wireless device may determine orientation information of the second wireless device based at least in part on the inertial sensor information. For example, referring to FIG. 5, the inertial sensor data 505 (e.g., gyroscope data and accelerometer data), received from the moving wireless device, may be by the orientation component 504 to determine an orientation of the moving wireless device.

At 708, the first wireless device may determine tilt information associated with the second wireless device based at least in part on the inertial sensor information. For example, referring to FIG. 5, to isolate gravity, the tilt estimation component 506 may estimate tilt (e.g., the roll and pitch of the moving wireless device), or equivalently the down direction z in terms of u, v, and w.

At 710, the first wireless device may de-rotate an accelerometer component of the inertial sensor information and remove a gravity component of the acceleration information to generate de-rotated and gravity free acceleration information based at least in part on the tilt information. For example, referring to FIG. 5, the de-rotated and gravity free acceleration component 508 may use the relative attitude information and/or tilt estimation received from the tilt estimation component 506 to de-rotate the accelerometer data and remove the gravity portion of the orientation information received from the orientation component 504.

At 712, the first wireless device may integrate the de-rotated and gravity free acceleration information to determine sensor derived trajectory information. For example, referring to FIG. 5, the integrated acceleration component 510 may double integrate the remaining acceleration in the orientation information received from the de-rotated and gravity free acceleration component 508 in order to determine sensor derived trajectory information, which may include the local trajectory to within an unknown position with a constant velocity and yaw.

At 714, the first wireless device may determine combined position information based at least in part on the at least one AoA measurement and the at least one RTP measurement. For example, referring to FIG. 5, the position combiner component 502 may be used to determine combined position information using the AoA data and RTP data.

Referring to FIG. 7B, at 716, the first wireless device may determine a distance to the second wireless device associated with each of the at least one RTP measurement. Referring to FIG. 6, the first wireless device 602 (e.g., the trajectory solver component 512 in FIG. 5) may estimate the distance $D_n$ 615 at a time corresponding to each phase observation 625a, 625b, 625c, 625d, 625e. In the third example, $D_n$ 615 may be a function of both the phase at a particular phase observation 625a, 625b, 625c, 625d, 625e, and the hypothetical trajectory at each of the phase observations 625a, 625b, 625c, 625d, 625e. $D_n$ may be determined using a component of the hypothetical velocity along the distance vector, and an adjustment to the observed phase that shifts the phase to the end time (e.g., the time of phase observation 625e) according to the time delta and projected speed.

At 718, the first wireless device may determine an estimated speed of the second wireless device at an end of a set of RTP measurements. For example, referring to FIG. 6, the projected speed may be represented by equation 5, where $\phi$ is the projected phase, $\rho$ is the phase at a particular phase observation, $\underline{v}(t) \cdot \hat{D}$ may be the projected line of sight speed, $\Delta t$ may be the time interval, and $\lambda$ may be the Bluetooth wavelength.

At 720, the first wireless device may determine a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement. For example, referring to equation 6 described in connection with FIG. 6, E may be the overall cost to minimize, $\hat{\underline{r}}(t)$ may be the estimated trajectory of the second wireless device 604 with respect to the first wireless device 602, $w(t_n)$ may be a weighting function that determines how to down-weight the importance of a past trajectory estimation, $\sigma_n^2$ may be the estimated variance associated with a particular AoA measurement and/or RTP measurement, $\phi$ may be the projected speed at the last phase measurement 625e, $D_n$ is the estimated distance at a particular phase observation, and $\underline{N}_m$ may be a unit vector pointing in the direction of AoA measurement(s) m.

At 722, the first wireless device may determine a path of trajectory of the second wireless device based at least in part on the at least one AoA measurement, the at least one RTP measurement, and the inertial sensor information. In certain aspects, the path of trajectory of the second wireless device is further determined based at least in part on the weighting function. For example, referring to FIG. 5, to estimate the unknowns and determine the overall trajectory, the trajectory solver component 512 may combine the sensor derived trajectory information (e.g., received from the integrated acceleration component 510 with the absolute constraints of the AoA measurements and RTP measurements received from the position combiner component 502 (e.g., or from an AoA measurement component and RTP measurement component when the position combiner component 502 is omitted). Referring to FIG. 6, using the cost function represented by equation 6, the first wireless device 602 may be able to determine the estimated trajectory 603 of the second wireless device 604.

At 724, the first wireless device may determine the path of trajectory of the second wireless device by combining the sensor derived trajectory information with the combined position information to determine the path of trajectory of the second wireless device. For example, referring to FIG. 5, to estimate the unknowns and determine the overall trajectory, the trajectory solver component 512 may combine the sensor derived trajectory information (e.g., received from the integrated acceleration component 510 with the absolute constraints of the AoA measurements and RTP measurements received from the position combiner component 502.

At 726, the first wireless device may determine the path of trajectory of the second wireless device by combining the sensor derived trajectory information, the at least one AoA measurement, and the at least one RTP measurement to determine the path of trajectory of the second wireless device. For example, referring to FIG. 5, to estimate the unknowns and determine the overall trajectory, the trajectory solver component 512 may combine the sensor derived trajectory information received from the integrated acceleration component 510, the AoA measurements and RTP measurements received from an AoA measurement component and RTP measurement component (e.g., when the position combiner component 502 is omitted).

Figure 8:
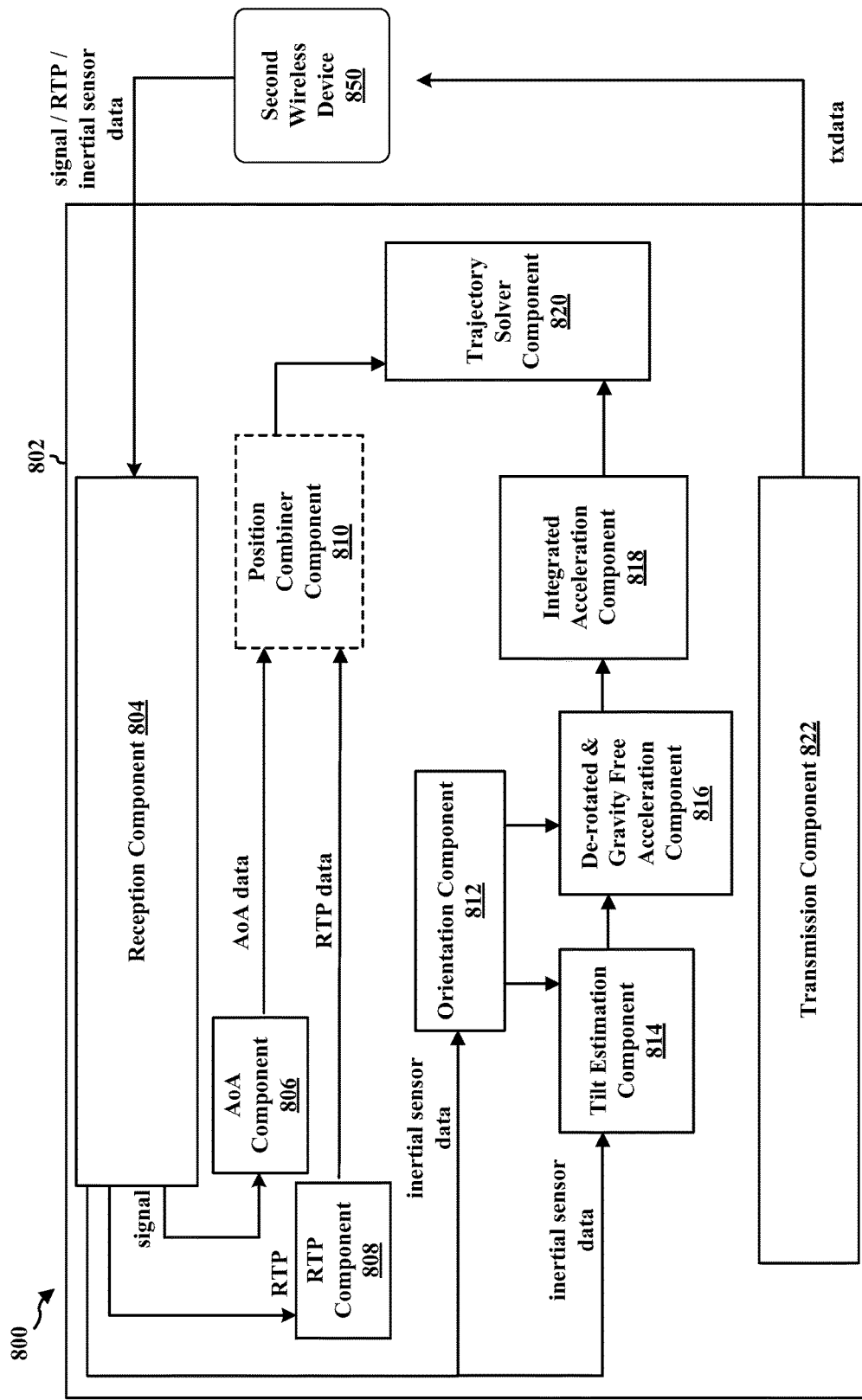
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a first wireless device (e.g., the central device 102, the wireless device 200, 500, the first wireless device 402, 602 the apparatus 802') in communication with a second wireless device 850 (e.g., the peripheral device 104, 106, 108, the wireless device 200, the second wireless device 404, 604). The apparatus may include a reception component 804, an AoA component 806, an RTP component 808, a position combiner component 810, an orientation component 812, a tilt estimation component 814, a de-rotated and gravity free acceleration component 816, an integrated acceleration component 818, a trajectory solver component 820, and a transmission component 822.

The reception component 804 may be configured to receive at least one signal from a second wireless device 850, and send the at least one signal to one or more of the AoA component 806, the RTP component 808, the orientation component 812, and/or the position combiner component 810. In certain aspects, the at least one signal including one or more of a data signal, a control signal, RTP information or inertial sensor information.

The AoA component 806 may be configured to determine AoA data associated with the at least one signal. The RTP component 808 may be configured to determine RTP data associated with the at least one signal. The AoA component 806 may be configured to send the AoA data to the position combiner component 810 and/or the trajectory solver component 820, and the RTP component 808 may be configured to send the RTP data to the position combiner component 810 and/or the trajectory solver component 820.

The orientation component 812 may be configured to determine orientation information of the second wireless device 850 based at least in part on the inertial sensor information. The orientation component 812 may be configured to send the orientation information to the tilt estimation component 814 and/or the de-rotated and gravity free acceleration component 816.

The tilt estimation component 814 may be configured to determine a tilt of the second wireless device 850 based at least in part on the inertial sensor information. The tilt estimator component may be configured to send tilt information to the de-rotated and gravity free acceleration component 816.

The de-rotated and gravity free acceleration component 816 may be configured to de-rotate an accelerometer component of the inertial sensor information and remove a gravity component of the acceleration information to generate de-rotated and gravity free acceleration information based at least in part on the tilt information. The de-rotated and gravity free acceleration component 816 may be configured to send the de-rotated and gravity free acceleration information to the integrated acceleration component 818.

The integrated acceleration component 818 may be configured to integrate the de-rotated and gravity free acceleration information to determine sensor derived trajectory information. The integrated acceleration component 818 may be configured to send the sensor derived trajectory information to the trajectory solver component 820.

The position combiner component 810 may be configured to determine combined position information based at least in part on the at least one AoA measurement and the at least one RTP measurement. The position combiner component 810 may be configured to send the combined position information to the trajectory solver component 820.

The trajectory solver component 820 may be configured to determine a distance to the second wireless device 850 associated with each of the at least one RTP measurement. The trajectory solver component 820 may be configured to determine an estimated speed of the second wireless device at an end of a set of RTP measurements. The trajectory solver component 820 may be configured to determine a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement. The trajectory solver component 820 may be configured to determine a path of trajectory of the second wireless device 850 based at least in part on the at least one AoA measurement, the at least one RTP measurement, and the inertial sensor information. In certain aspects, the path of trajectory of the second wireless device is further determined based at least in part on the weighting function. The trajectory solver component 820 may be configured to determine a path of trajectory of the second wireless device 850 by combining the sensor derived trajectory information with the combined position information to determine the path of trajectory of the second wireless device 850. The trajectory solver component 820 may be configured to determine a path of trajectory of the second wireless device 850 by combining the sensor derived trajectory information, the at least one AoA measurement, and the at least one RTP measurement to determine the path of trajectory of the second wireless device 850.

The transmission component 822 may be configured to send at least one RTP signal, a data signal, and/or a control signal to the second wireless device 850.

The apparatus may include additional components that perform each of the blocks of the algorithm in the aforementioned flowcharts of FIGS. 7A and 7B. As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
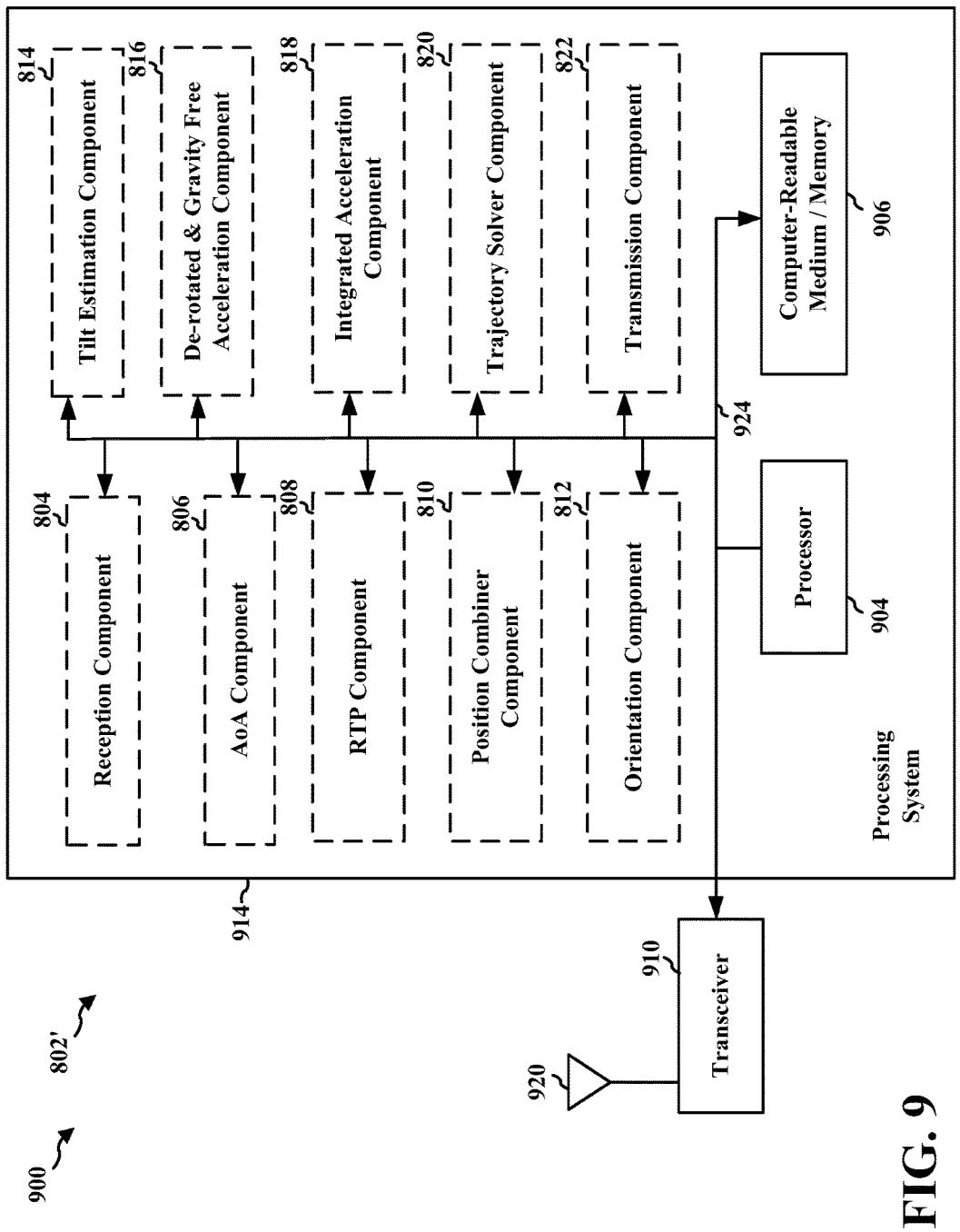
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820, 822, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 822, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820, 822. The components may be software components running in the processor 904, resident/stored in the computer readable medium/memory 906, one or more hardware components coupled to the processor 904, or some combination thereof.

In certain configurations, the apparatus 802/802' for wireless communication may include means for receiving at least one signal from a second wireless device. In certain aspects, the at least one signal including one or more of RTP information or inertial sensor information. In certain other configurations, the apparatus 802/802' for wireless communication may include means for determining at least one AoA measurement and at least one RTP measurement associated with the at least one signal received from the second wireless device. In certain other configurations, the apparatus 802/802' for wireless communication may include means for determining orientation information of the second wireless device based at least in part on the inertial sensor information. In certain other configurations, the apparatus 802/802' for wireless communication may include means for determining a tilt of the second wireless device based at least in part on the inertial sensor information. In certain other configurations, the apparatus 802/802' for wireless communication may include means for de-rotating an accelerometer component of the inertial sensor information and means for removing a gravity component of the acceleration information to generate de-rotated and gravity free acceleration information based at least in part on the tilt information. In certain other configurations, the apparatus 802/802' for wireless communication may include means for integrating the de-rotated and gravity free acceleration information to determine sensor derived trajectory information. In certain other configurations, the apparatus 802/802' for wireless communication may include means for determining combined position information based at least in part on the at least one AoA measurement and the at least one RTP measurement. In certain other configurations, the apparatus 802/802' for wireless communication may include means for determining a distance to the second wireless device associated with each of the at least one RTP measurement. In certain other configurations, the apparatus 802/802' for wireless communication may include means for determining an estimated speed of the second wireless device at an end of a set of RTP measurements. In certain other configurations, the apparatus 802/802' for wireless communication may include means for determining a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement. In certain other configurations, the apparatus 802/802' for wireless communication may include means for determining a path of trajectory of the second wireless device based at least in part on the at least one AoA measurement, the at least one RTP measurement, and the inertial sensor information. In certain aspects, the path of trajectory of the second wireless device is further determined based at least in part on the weighting function. In certain aspects, the means for determining path of trajectory of the second wireless device may be configured to combine the sensor derived trajectory information with the combined position information to determine the path of trajectory of the second wireless device. In certain aspects, the means for determining path of trajectory of the second wireless device may be configured to combine the sensor derived trajectory information, the at least one AoA measurement, and the at least one RTP measurement to determine the path of trajectory of the second wireless device. The aforementioned means may be the processor(s) 202, the radio 230, the MMU 240, the WLAN controller 250, short-range communication controller 252, the WWAN controller 256, the position combiner component 502, the orientation component 504, the tilt estimation component 506, the de-rotated and gravity free acceleration component 508, the integrated acceleration component 510, the trajectory solver component 512, one or more of the aforementioned components of the apparatus 802 and/or the processing system 914 of the apparatus 802' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication of a first wireless device, comprising:
   receiving at least one signal from a second wireless device, the at least one signal including one or more of round-trip phase (RTP) information or inertial sensor information;
   determining at least one angle-of-arrival (AoA) measurement and at least one RTP measurement associated with the at least one signal received from the second wireless device;
   determining a path of trajectory of the second wireless device based on the inertial sensor information and at least in part on the at least one AoA measurement and the at least one RTP measurement;
   determining orientation information of the second wireless device based at least in part on the inertial sensor information;

determining tilt information associated with the second wireless device based at least in part on the inertial sensor information;

de-rotating an accelerometer component of the inertial sensor information and removing a gravity component of the acceleration information to generate de-rotated and gravity free acceleration information based at least in part on the tilt information; and integrating the de-rotated and gravity free acceleration information to determine sensor derived trajectory information.

2. The method of claim 1, further comprising:

determining combined position information based at least in part on the at least one AoA measurement and the at least one RTP measurement, wherein determining the path of trajectory of the second wireless device comprises:

combining the sensor derived trajectory information with the combined position information to determine the path of trajectory of the second wireless device.

3. The method of claim 1, wherein the determining the path of trajectory of the second wireless device comprises:

combining the sensor derived trajectory information, the at least one AoA measurement, and the at least one RTP measurement to determine the path of trajectory of the second wireless device.

4. The method of claim 1, further comprising:

determining a distance to the second wireless device associated with each of the at least one RTP measurement; and determining an estimated speed of the second wireless device at an end of a set of RTP measurements.

5. The method of claim 4, further comprising:

determining a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement, wherein the path of trajectory of the second wireless device is further determined based at least in part on the weighting function.

6. An apparatus for wireless communication of a first wireless device, comprising:

means for receiving at least one signal from a second wireless device, the at least one signal including one or more of round-trip phase (RTP) information or inertial sensor information;

means for determining at least one angle-of-arrival (AoA) measurement and at least one RTP measurement associated with the at least one signal received from the second wireless device;

means for determining a path of trajectory of the second wireless device based on the inertial sensor information and at least in part on the at least one AoA measurement and the at least one RTP measurement;

means for determining orientation information of the second wireless device based at least in part on the inertial sensor information;

means for determining tilt information associated with the second wireless device based at least in part on the inertial sensor information;

means for de-rotating an accelerometer component of the inertial sensor information and means for removing a gravity component of the acceleration information to generate de-rotated and gravity free acceleration information based at least in part on the tilt information; and means for integrating the de-rotated and gravity free acceleration information to determine sensor derived trajectory information.

7. The apparatus of claim 6, further comprising:

means for determining combined position information based at least in part on the at least one AoA measurement and the at least one RTP measurement, wherein the means for determining the path of trajectory of the second wireless device is configured to:

combine the sensor derived trajectory information with the combined position information to determine the path of trajectory of the second wireless device.

8. The apparatus of claim 6, wherein the means for determining the path of trajectory of the second wireless device is configured to:

combine the sensor derived trajectory information, the at least one AoA measurement, and the at least one RTP measurement to determine the path of trajectory of the second wireless device.

9. The apparatus of claim 6, further comprising:

means for determining a distance to the second wireless device associated with each of the at least one RTP measurement; and means for determining an estimated speed of the second wireless device at an end of a set of RTP measurements.

10. The apparatus of claim 9, further comprising:

means for determining a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement, wherein the path of trajectory of the second wireless device is further determined based at least in part on the weighting function.

11. An apparatus for wireless communication of a first wireless device, comprising:

a memory; and at least one processor coupled to the memory and configured to:

receive at least one signal from a second wireless device, the at least one signal including one or more of round-trip phase (RTP) information or inertial sensor information;

determine at least one angle-of-arrival (AoA) measurement and at least one RTP measurement associated with the at least one signal received from the second wireless device;

determine a path of trajectory of the second wireless device based on the inertial sensor information and at least in part on the at least one AoA measurement and the at least one RTP measurement;

determine orientation information of the second wireless device based at least in part on the inertial sensor information;

determine tilt information associated with the second wireless device based at least in part on the inertial sensor information;

de-rotate an accelerometer component of the inertial sensor information and remove a gravity component of the acceleration information to generate de-rotated and gravity free acceleration information based at least in part on the tilt information; and integrate the de-rotated and gravity free acceleration information to determine sensor derived trajectory information.

12. The apparatus of claim 11, wherein the at least one processor is further configured to:
determine combined position information based at least in part on the at least one AoA measurement and the RTP at least one measurement, wherein the wherein the at least one processor is configured to determine the path of trajectory of the second wireless device by:
combining the sensor derived trajectory information with the combined position information to determine the path of trajectory of the second wireless device.

13. The apparatus of claim 11, wherein the at least one processor is configured to determine the path of trajectory of the second wireless device by:
combining the sensor derived trajectory information, the at least one AoA measurement, and the at least one RTP measurement to determine the path of trajectory of the second wireless device.

14. The apparatus of claim 11, wherein the at least one processor is further configured to:
determine a distance to the second wireless device associated with each of the at least one RTP measurement; and
determine an estimated speed of the second wireless device at an end of a set of RTP measurements.

15. The apparatus of claim 14, wherein the at least one processor is further configured to:
determine a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement, wherein the path of trajectory of the second wireless device is further determined based at least in part on the weighting function.

16. A non-transitory computer-readable medium storing computer-executable code of a first wireless device, comprising code to:
receive at least one signal from a second wireless device, the at least one signal including one or more of round-trip phase (RTP) information or inertial sensor information;
determine at least one angle-of-arrival (AoA) measurement and at least one RTP measurement associated with the at least one signal received from the second wireless device;
determine a path of trajectory of the second wireless device based on the inertial sensor information and at least in part on the at least one AoA measurement and the at least one RTP measurement;
determine orientation information of the second wireless device based at least in part on the inertial sensor information;
determine tilt information associated with the second wireless device based at least in part on the inertial sensor information;
de-rotate an accelerometer component of the inertial sensor information and remove a gravity component of the acceleration information to generate de-rotated and gravity free acceleration information based at least in part on the tilt information; and
integrate the de-rotated and gravity free acceleration information to determine sensor derived trajectory information.

17. The non-transitory computer-readable medium of claim 16, further comprising code to:
determine combined position information based at least in part on the at least one AoA measurement and the at least one RTP measurement, wherein the code to determine the path of trajectory of the second wireless device is configured to:
combine the sensor derived trajectory information with the combined position information to determine the path of trajectory of the second wireless device.

18. The non-transitory computer-readable medium of claim 16, wherein the code to determine the path of trajectory of the second wireless device is configured to:
combine the sensor derived trajectory information, the at least one AoA measurement, and the at least one RTP measurement to determine the path of trajectory of the second wireless device.

19. The non-transitory computer-readable medium of claim 16, further comprising code to:
determine a distance to the second wireless device associated with each of the at least one RTP measurement; and
determine an estimated speed of the second wireless device at an end of a set of RTP measurements.

20. The non-transitory computer-readable medium of claim 19, further comprising code to:
determine a cost function based at least in part on the distance to the second wireless device associated with each of the at least one RTP measurement, the estimated speed of the second wireless device at the end of the set of RTP measurements, a weighting function, and a variance associated with the at least one AoA measurement and the at least one RTP measurement, wherein the path of trajectory of the second wireless device is further determined based at least in part on the weighting function.

* * * * *